United States Patent [19]

Musgrove

[11] 4,158,900
[45] Jun. 26, 1979

[54] TRAFFIC REGULATING HIVE BOTTOM BOARD

[76] Inventor: John Musgrove, 629 Lebanon St., Monroe, Ohio 45050

[21] Appl. No.: 842,595

[22] Filed: Oct. 17, 1977

[51] Int. Cl.² ............................................. A01K 47/06
[52] U.S. Cl. ..................................................... 6/4 R
[58] Field of Search ...................... 6/1, 2 R, 2 A, 4 R

[56] References Cited

U.S. PATENT DOCUMENTS

| 227,979 | 5/1880 | Kidder et al. | 6/4 R |
| 239,239 | 3/1881 | Frazee | 6/4 R |
| 346,883 | 8/1886 | Armstrong | 6/2 A |

FOREIGN PATENT DOCUMENTS 640843  7/1950  United Kingdom ........................ 6/4 R Primary Examiner—Hugh R. Chamblee
Attorney, Agent, or Firm—Melville, Strasser, Foster & Hoffman

[57] ABSTRACT

A bottom board for beehives for controlling the direction of travel of arriving and departing bees. Arriving bees are guided directly to the honeycomb frames by means of an upwardly inclined landing deck, which also serves to separate arriving bees from departing bees leaving the hive by means of a descending departure ramp located beneath the landing deck, thus insuring an uncongested one-way traffic pattern. A slotted false bottom located in the bottom board also serves to control the direction of travel of arriving and departing bees.

5 Claims, 2 Drawing Figures

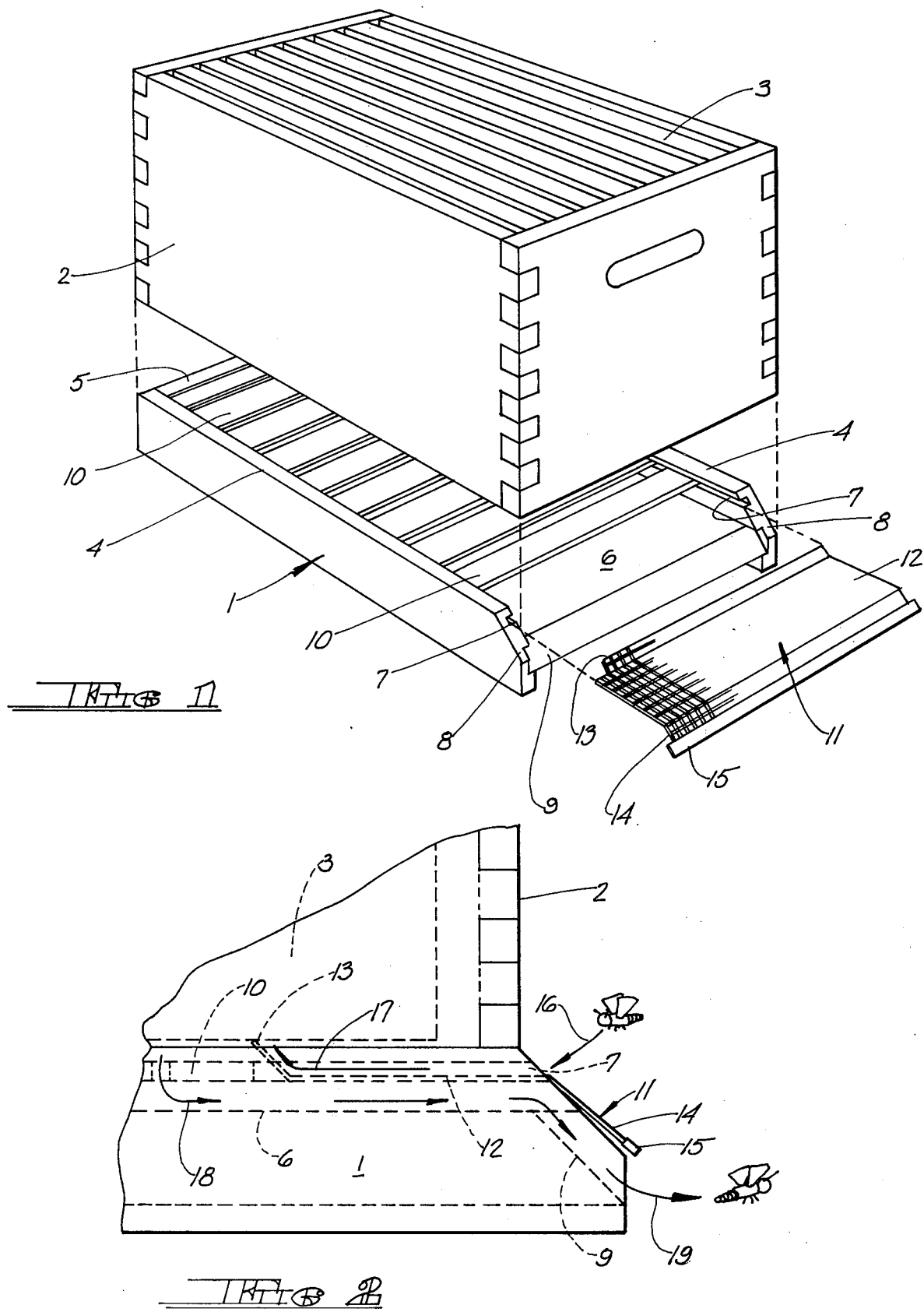

TRAFFIC REGULATING HIVE BOTTOM BOARD

BACKGROUND OF THE INVENTION

1. Field of the Invention

The present invention relates generally to apiarian apparatus and more particularly to a traffic regulating bottom board for use with a beehive.

2. Description of the Prior Art

Devices for controlling the direction of traffic flow in a beehive for reducing congestion, and generally improving the efficiency of the hive, have been suggested by prior art workers, such as V. E. Root in U.S. Pat. No. 3,200,419 issued Aug. 17, 1965. These workers have emphasized the importance of adapting the beehive design to coincide with the instincts and habits of honeybees. In particular, it has been found that the uncontrolled mixing of departing bees with arriving bees bearing nectar or pollen may result in considerable confusion among the members of the brood, which can lead to a loss in honey production. In addition, orderly hive management can also prevent unwanted swarming, propolis production, comb gnawing, bee fatalities and other inefficient and uneconomical behavior. While there have been attempts to solve these problems, such apparatus has been relatively complex and not adapted for easy installation on existing apiaries. Hence, there has not been widespread acceptance of such devices among commerical and hobbyist beekeepers.

SUMMARY OF THE INVENTION

My invention provides means for orderly controlling arriving and departing honeybee traffic and can be adapted for use in existing hives. In one preferred embodiment, the inside surfaces of the sides of a conventional bottom board are provided with a groove or slot capable of accepting a plurality of thin spaced slats, thus providing access passages greater than the bee space above and below the slats. While a type of slatted construction has been used heretofore in the so-called Killion and Bovard rocks which are placed above a standard bottom board to improve egg laying in the lower brood chamber and reduce entrance congestion, such slats have not been made an integral part of the bottom board. In my construction, sufficient space is left between adjoining slats to permit easy access of the bees to the area beneath the slats. This arrangement improves hive ventilation without creating drafts and also results in a cleaner bottom board floor devoid of propolis ramps which honeybees normally construct to gain access to honeycomb frames. Furthermore, the slatted construction produces less comb gnawing and therefore a better brood pattern. The slats may also be made removable for ease in cleaning dead insects and other debris from the bottom board floor.

Another important feature of my invention is the use of a removable upwardly inclined arrival ramp positioned at the entrance to the bottom board, which guides incoming bees directly to the honeycomb frames. The arrival ramp is constructed of a wire mesh or similar material to improve hive ventilation and is slidably received within the slot or groove in the bottom board walls so that the ramp assumes a position substantially parallel to the bottom board floor. The forward edge of the arrival ramp is downwardly inclined to provide a landing deck for the incoming honeybees. This construction permits easier deceleration for the load-bearing bees and results in less loss of nectar or pollen. After alighting on the landing deck, the bees are directed across a substantially planar horizontal portion of the arrival ramp to an upwardly inclined ladder portion at the rear of the ramp which leads directly to the lower edge of the honeycomb frames. Since the ramp extends completely across the full width of the bottom board, there is ample room for guard bees to police the entrance.

Bees leaving the hive move downwardly from the honeycomb frames, through the spaces between the bottom board slats, and along the floor of the bottom board beneath the arrival ramp to the front of the bottom board. The front of the bottom board is fashioned in a downwardly sloping departure ramp substantially parallel to the downwardly inclined landing deck of the arrival ramp, from which the bees may exit the hive. Since the departure ramp extends substantially across the entire width of the bottom board, there is also ample room for guard bees to police the exit space. In addition, since the bottom board is divided laterally into entrance and exit spaces of slightly greater height than the bee space, mice, rodents and other undesired visitors are excluded. The ramp is removable to permit the floor of the bottom board to be easily cleaned, or to be replaced by an entrance reducer during winter months in colder climates.

BRIEF DESCRIPTION OF THE DRAWINGS

FIG. 1 is an exploded perspective view of the traffic regulating hive bottom board of the present invention in association with a hive body.

FIG. 2 is a fragmentary side elevaton view, partially in cross section, of the hive bottom board of the present invention.

DESCRIPTION OF THE PREFERRED EMBODIMENTS

FIG. 1 illustrates an exploded perspective view of the traffic regulating hive bottom board of the present invention, shown generally at 1, in association with a typical hive body 2 containing a plurality of honeycomb frames or supers, one of which is shown at 3. As is well known in the art, the lower edge of hive body 2 rests upon and is supported by the upper edges of the sides and back of the bottom board 1, designated as 4 and 5, respectively, in FIG. 1.

Bottom board 1 is similar to conventional bottom boards and comprises a planar floor board 6 supporting a pair of side rails 4 and a back 5. Side rails 4 and back 5 may be attached to floor board 6 by nailed tongue and groove construction or other conventional fastening means. Conventional bottom boards are generally constructed to provide a three-quarter to seven-eighths inch bee space between the upper surface of the floor boards and the top surface of the side rails when the bottom board is installed in one position, and a three-eighths inch bee space between the upper surface of the floor board and the upper edge of the side rails when the bottom board is installed in the inverted position. For modifying a standard bottom board in connection with the present invention, it is preferred that the bottom board be installed using the three-quarter to seven-eighths inch bee space.

A groove or slot 7 is inscribed along the center of the inner surface of each side rail 4. As will be explained in more detail hereinafter, groove 7 serves to accept a plurality of slats and a landing ramp which operate to control the direction of travel of arriving and departing bees. The forwardmost ends of each side rail 4 are chamfered at approximately a 45° angle, as at 8, to provide a sloping surface on the front edge of each side rail 4. Chamfer 8 begins at approximately the center of floor board 6 and slopes rearwardly and upwardly to the upper surface of side rail 4. Similarly, the forwardmost edge of floor board 6 is chamfered, as at 9, to provide a surface parallel to chamfer 8. It will be understood that bottom board 1 may be constructed of any suitable material, such as cypress wood, or the like.

Grooves 7 are adapted to receive therein the ends of a plurality of thin spaced slats, one of which is shown at 10, which form a false bottom separating the bottom board into a lower passageway enclosed between the lower surface of slats 10 and the upper surface of bottom board 6, and an upper passageway formed between the upper surface of slats 10 and the lower edges of honeycomb frames 3 of hive body 2. Slats 10 may be affixed to side rails 4 of bottom board 1 by any convenient means, such as nailing or the like; however it is preferred that slats 10 be removably secured within groove 7 so that they can be removed for ease of cleaning of the bottom board floor. The spaces between the slats are so dimensioned to permit access by bees leaving honeycomb frames 3 to the space below slats 10. In addition, the spaces also improve ventilation of the hive.

Hive bottom board 1 also includes a slanting ramp, shown generally at 11, which is slidably received within grooves 7 adjacent the front end of bottom board 1. Landing ramp 11 comprises a flat horizontal planar portion 12 extending completely across bottom board 1, the ends of which are received in grooves 7. Planar portion 12 extends several inches into bottom board 1 to permit incoming bees to gain access to honeycomb frames 3. The rearwardmost edge of landing ramp 11 slopes upwardly and rearwardly toward honeycomb frames 3 to form a ladder, illustrated at 13, so that honeybees may easily pass from ladder 13 to the lower edge of honeycomb frames 3. The forwardmost end of landing ramp 11 slopes forwardly and downwardly, overlying chamfered portions 8 of side rails 4, to form a landing deck, illustrated at 14 in FIG. 2, whereupon honeybees approaching the hive may decelerate and be guided into the interior of the hive. The lowermost edge of landing deck 14 may contain a solid metal strip, or the like, 15 to provide a suitable grasping surface for attaching landing ramp 11 to bottom board 1. While landing ramp 1 may be constructed of any suitable material, it is preferred that a metal screen or mesh be utilized to increase hive ventilation.

It will be observed that with landing ramp 11 in place, the space provided between the upper surface of ramp 11 and the lower edge of honeycomb frames 13 (entrance area) and the space provided between the lower surface of ramp 11 and the upper surface of floor 6 (exit space), is such as to exclude mice and other undesirable hive visitors, while permitting easy access for honeybees. The entrance spacing also results in a cleaner base floor devoid of propolis ramps which honeybees may sometimes construct to gain access to the lower edges of honeycomb frames 3. The lack of propolis ramps also results in less comb gnawing at the lower edge of the honeycomb frames and a consequently better brood pattern. Since the ramp is removable, easy access may be gained to floor 6 for cleaning. In addition, during the winter months, ramp 11 can be removed and replaced by an entrance reducer as is well understood in the art. In operation, incoming honeybees approach and light upon landing deck 14, as depicted by arrow 16 in FIG. 2, thus serving to gradually decelerate their forward motion and preventing dislodging of nectar or pollen. The bees then move upwardly and inwardly along landing deck 14 and planar portion 12 to ladder 13. From ladder 13, the bees may easily access the lower edges of honeycomb frames 3, as depicted by arrow 17. Bees wishing to leave the hive descend along the honeycomb frames 3 and pass through the spaces between slats 10 to floor 6 of bottom board 1. Departing bees may then move along floor 6, as depicted by arrow 18 in FIG. 2, and exit the hive along path 19 by way of chamfer 9 of bottom board 1 which forms a depature deck. Hence, the direction of travel of arriving and departing bees is controlled in an orderly manner to provide uncongested one-way movement. In addition, arriving honeybees instinctively will seek the open area provided by landing ramp 14 rather than the limited space presented by departure deck 9, while departing bees will choose the path represented by arrow 18 rather than descending along ladder 13, thus insuring the one-way moement. Further, this construction also provides ample space along landing ramp 14 and departure deck 9 for guard bees to police these entrance and exit space.

It will be understood that various changes in the details, materials, steps and arrangement of parts, which have been herein described and illustrated in order to explain the nature of the invention, may be made by those skilled in the art within the principle and scope of the invention as expressed in the appended claims.

The embodiments of the invention in which an exclusive property or privilege is claimed are defined as follows:

1. A traffic regulating hive bottom board for use with a hive body containing a plurality of honeycomb frames to insure substantially one-way traffic for arriving and departing bees, said bottom board comprising entrance means for permitting arriving bees access to the honeycomb frames but substantially preventing exit therefrom, and exit means for permitting the departing bees to leave the hive but substantially preventing entrance thereto, said board including a horizontal planar floor and vertical side rails attached to the outside edges of said floor, each of said rails containing a longitudinal groove inscribed therein, said entrance means comprising a landing ramp slidably and removably received in said grooves, said ramp including a landing deck upon which arriving bees may land, means adjacent said landing deck for directing the arriving bees to the entrance of the hive body, and a ladder associated with said directing means for conducting the bees to the honeycomb frames.

2. The bottom board according to claim 1 wherein said exit means includes a forwardly and downwardly sloping ramp positioned on the forwardmost end of said floor to form a departure deck for bees leaving said bottom board.

3. The bottom board according to claim 1 wherein said landing ramp is formed of a mesh-like material to insure proper hive ventilation.

4. The bottom board according to claim 1 wherein said exit means comprises a plurality of spaced thin elongated slats supported by their ends in said grooves, said slats dividing said bottom board into an upper crawl space formed between the upper surfaces of said slats and the lower edges of the honeycomb frames, and a lower crawl space formed between the lower surfaces of said slats and the upper surface of said floor, said crawl spaces and the spaces between said slats being at least bee space.

5. The bottom board according to claim 4 wherein said slats are removably secured to said bottom board.

* * * * *